Oct. 12, 1926.
T. H. LYNN
TIRE CARRIER
Filed April 11, 1922
1,602,916
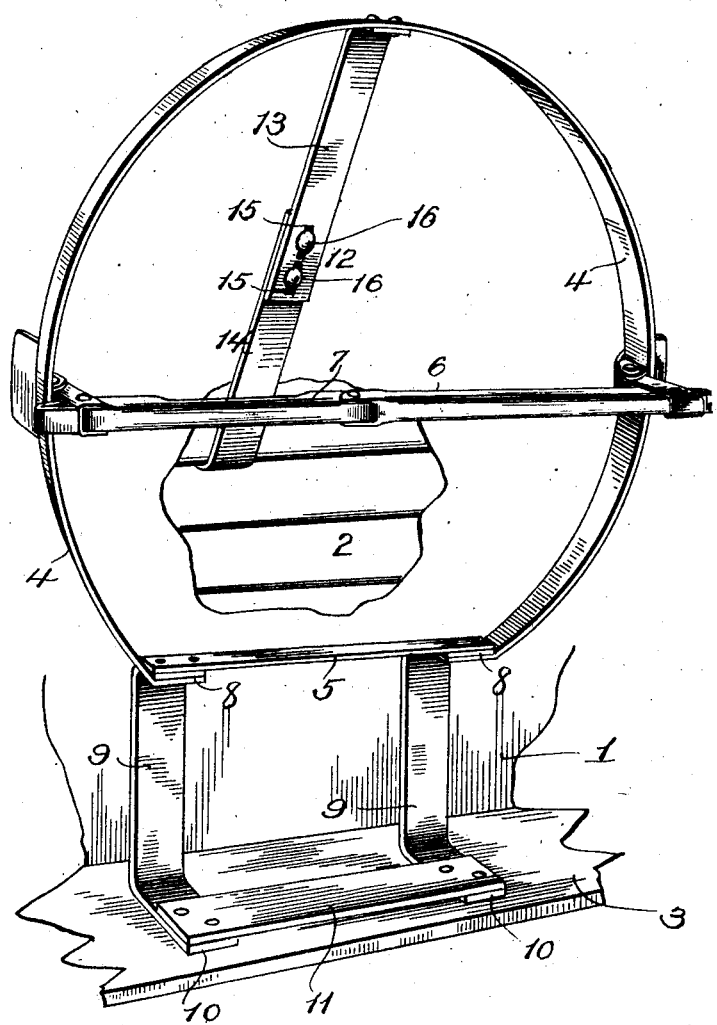
Inventor
T. H. Lynn
By Seymour & Bright
Attorneys Patented Oct. 12, 1926.

1,602,916

UNITED STATES PATENT OFFICE.

THOMAS H. LYNN, OF WILLIAMSPORT, PENNSYLVANIA.

TIRE CARRIER.

Application filed April 11, 1922. Serial No. 551,510.

This invention relates to improvements in tire carriers and more particularly to means for supporting such carrier and connecting the same with the automobile,—one object of the invention being to provide simple and rigid means for effectually attaching a tire carrier to the side of the car frame and supporting it upon the running-board.

With this and other objects in view, the invention consists in certain novel features of construction as hereinafter set forth and pointed out in the claim.

The accompanying drawing is a perspective view showing an embodiment of the invention.

In the drawing, a portion of a car body is represented at 1 and a portion of the frame is shown at 2,—the running board being illustrated at 3.

The tire carrier shown is of the hoop type, segmental in form and having the lower ends of its strap or body portion 4 connected by a cross-bar 5 and the locking levers 6—7 are disposed horizontally.

The outwardly projecting upper end portions 8 of U-shaped supports 9 are disposed between the lower ends of the body portion 4 of the carrier and the cross-bar 5 and these parts are rigidly secured together. The outwardly projecting members 10 of the U-shaped supports are mounted upon the running-board 3 and are connected by a cross-bar 11. The respective ends of the cross-bar 11 are mounted upon and rigidly secured to the members or feet-portions 10 of the supports 9 and if desired said portions 10 may be secured to the running-board.

A brace 12 extends from the upper portion of the carrier 4 to the car frame 2 and is connected with the latter as shown in the drawing. The brace 12 comprises two members 13 and 14, the adjacent portions of which overlie each other and one of said members is provided with elongated slots 15 for the accommodation of securing means 16 and thus it will be seen that the two members composing the brace 12 are adjustably connected together.

Having fully described the invention what is claimed as new and is desired to be covered by Letters-Patent, is:

A tire carrier comprising a segmental band having its ends below the centre of its arc, a straight bar extending between the ends of the band, vertical supporting bars having their upper ends turned outwardly and disposed between and secured to the respective ends of the said bar and the segmental band, the lower ends of said supporting bars extending outwardly and being adapted to be secured upon the running board of a vehicle, a bar secured to and extending between said outwardly extending lower ends of the supporting bars, and a brace secured at its upper end to the top of the segmental band and extending obliquely downward therefrom substantially in the plane of the vertical diameter of the band, the lower end of said brace being constructed for attachment to the body of a vehicle.

In testimony whereof, I have signed this specification.

THOMAS H. LYNN.